United States Patent [19]

Ninane et al.

[11] 3,967,039

[45] June 29, 1976

[54] COATED ALKALI METAL CHLORITE PARTICLES

[75] Inventors: Leon Ninane, Bierges; Willy Kegelart, Brussels, both of Belgium

[73] Assignee: Solvay & Cie, Brussels, Belgium

[22] Filed: Apr. 17, 1973

[21] Appl. No.: 352,048

[30] Foreign Application Priority Data
May 4, 1972   Belgium ............................. 117080

[52] U.S. Cl. .............................. 428/403; 427/213; 427/215; 423/472
[51] Int. Cl.$^2$ ............................................. B32B 9/00
[58] Field of Search .................. 117/100 B, 169 R; 252/187 R; 423/499, 472, 266; 428/403

[56]  References Cited
UNITED STATES PATENTS

| | | | |
|---|---|---|---|
| 2,071,094 | 2/1937 | Vincent | 252/187 R X |
| 2,711,363 | 6/1955 | Waibel | 252/187 R X |
| 2,947,700 | 8/1960 | Waibel | 252/187 R X |
| 3,036,013 | 5/1962 | Jaszka et al. | 117/100 B X |
| 3,120,424 | 2/1964 | Ruedi | 252/187 R X |
| 3,408,746 | 11/1968 | Reynolds et al. | 117/100 B X |
| 3,547,573 | 12/1970 | Tourdot et al. | 252/187 R X |
| 3,580,851 | 5/1971 | Heid et al. | 252/187 R X |
| 3,671,296 | 6/1972 | Funakoshi et al. | 117/100 B |
| 3,684,558 | 8/1972 | Fujii et al. | 117/100 B |
| 3,711,319 | 1/1973 | Irikura et al. | 117/100 B |

FOREIGN PATENTS OR APPLICATIONS

| | | | |
|---|---|---|---|
| 652,350 | 11/1962 | Canada | 117/100 B |

*Primary Examiner*—William D. Martin
*Assistant Examiner*—Dennis C. Konopacki
*Attorney, Agent, or Firm*—Spencer & Kaye

[57]  ABSTRACT

In order to reduce the tendency to decompose of particles or granules of alkali metal chlorites and to enhance their stability, said particles or granules are completely coated with an inorganic salt or a mixture of such salts which are compatible with the chlorite and with each other, e.g. nitrates, carbonates, bicarbonates, phosphates, silicates and chlorides, especially alkali metal salts and alkaline earth metal salts thereof. The coating may be carried out by any conventional coating process, e.g. by contacting the particles with a solution of the stabilizing salts under vaporizing conditions in a rotating inclined disk, a rotary drum, or in a fluidized bed.

9 Claims, No Drawings

COATED ALKALI METAL CHLORITE PARTICLES

The present invention relates to alkali metal chlorite-containing particles, and particularly to processes for improving the stability of such particles.

Alkali metal chlorites in general may be obtained as, and sodium chlorite in particular is commercially available as, aqueous solutions, or solid products.

Solid alkali metal chlorites are known to be only moderately stable. When they are exposed to shocks, to rises in temperature or even to the presence of contaminants such as many organic compounds, sulphur or sulphur-containing compounds, the chlorites have a tendency to decompose - and this decomposition may even be explosive. Hitherto it has been proposed to reduce the tendency to decompose by admixing the chlorite with a solid inert diluent, such as sodium chloride, sodium carbonate, and various inorganic salts. Alkali metal and alkaline earth metal nitrates are, e.g., particularly favored diluents according to U.S. Pat. No. 2,711,363 in the name of Farbwerke Hoechst AG.

Solid alkali metal chlorites can be made either as a powder or as granules. Granules are of greater commercial interest, first because the toxic risks and fire hazards are reduced on account of the absence of small particles, and secondly, because granules having homogeneous composition and a predetermined range of particle diameters can be produced using conventional manufacturing processes. In our copending British patent application Ser. No. 16986/72, now British Pat. No. 1332764, published Oct. 3, 1973, there was described a process for the production of alkali metal chlorite granules, in which preformed seed particles in a fluidised bed were sprayed with an aqueous solution of chlorite which was evaporated, thereby depositing chlorite on the seed particles. In a preferred method of operation, the seed particles and/or the solution, contained an inorganic salt compatible with the chlorite. Although the resulting granules had somewhat enhanced stability, it is essential that solid commercially available chlorite should have as high a stability as possible. In the course of working towards this objective, we have discovered that an inorganic salt can enhance stability more in the form of a coating than the same amount of salt dispersed throughout the granules.

Consequently, according to the present invention there are provided alkali metal chlorite-containing particles coated with an inorganic salt. According to another aspect of the present invention there is provided a process for improving the stability of alkali metal chlorite-containing particles comprising coating the granules with an inorganic salt. Obviously only the salts which are compatible with the chlorite are to be used.

Sodium chlorite is particularly suitable as the alkali metal chlorite.

Desirably the inorganic salt may be selected from nitrates, carbonates, bicarbonates, phosphates, silicates and chlorides, and especially from alkali metal salts and alkaline earth metal salts thereof. Preferably the salt is a sodium or potassium salt, particularly the nitrate. Alternatively, any other inorganic salt which is found to be compatible with the alkali metal chlorite may be used in the present invention. Obviously, a mixture of salts, each of which is compatible with the chlorite and each other, may be employed instead of a single salt to form a coating. It has been observed that the stability of the coated particles increases as the amount of inorganic salt forming the coating increases. Preferably the particles are coated with at least 10% by weight of the inorganic salt, based on the uncoated particles.

As the particle size increases, so the ratio of volume to surface area of the particle increases and hence the stability improves of the particles coated with a fixed weight percentage of coating. Preferably the particles are large, i.e. they are in the form of granules as opposed to powder, not only for the above reason, but also because it is easer to obtain a complete coating for granules than for powders. Suitably the particles containing alkali metal chlorite may be composed entirely of chlorite, or a mixture of chlorites, but they are more usually a mixture of chlorite with one or more compatible inorganic salts as described hereinbefore. Particularly desirably the particles are inorganic salt-containing granules manufactured according to British patent application Ser. No. 16986/72, now British Pat. No. 1332764, published Oct. 3, 1973.

The stability of alkali metal chlorites to decomposition may be measured using various tests including measurement of the decomposition temperature and the "cigarette test" in which the particles are contacted with a lighted cigarette forming a localised source of heat. The improvement in stability of preferred embodiments of the present invention was particularly noticeable in the presence of certain selected solid organic compounds or sublimed sulphur. Certain embodiments according to the invention provide alkali metal chlorite-containing granules which suffer substantially no loss in weight when contacted, in the absence of contaminants, with a lighted cigarette.

Any conventional coating process may be used provided that it is compatible with the known properties of alkali metal chlorites. Thus the particles may be suitably contacted with a solution of the inorganic salt, preferably an aqueous solution. The choice of apparatus in which to carry out the coating process is not critical. Thus it may be for example, a rotating inclined disk, or a rotary drum. Other similar equipment may also be used. A particularly preferred apparatus is a fluidised bed, operated conventionally so that the particles, most preferably granules, are fluidised by an upward-flowing inert gas such as air or nitrogen and are contacted with a solution of the inorganic salt, the solvent of which evaporates off depositing a coating on the particles. The solution may be injected directly into the bed, srayed onto the bed or dispersed in the upward-flowing inert gas. The process may be operated batchwise, or continuously by using a compartmented bed. The exit of the coated particles may be obtained by a simple overflow device or by elutriation via an outlet located at any desired level in the bed.

Whichever apparatus employed it is preferable that the particles should be contacted with solution at a temperature sufficiently high to result in rapid evaporation of solvent from the solutions. Clearly, the preferred temperature will depend upon the solvent used and for water should be of the order of 60°C or more.

Certain embodiments according to the present invention will now be described by way of example only.

EXAMPLE 1

In Example 1 preformed sodium chlorite-containing granules were coated with sodium nitrate in a fluidised bed, in a discontinuous process.

The apparatus used comprised a vertical cylinder 30 cm in diameter and 150 cm high, at the base of which was a gas distributor plate having 2 mm holes. A bundle of heating tubes was also provided in the cylinder for providing heat by steam maintained at an effective pressure of 1 kg/cm².

Initially, the apparatus was charged with 40 kg of uniform technical sodium chlorite granules produced by a fluidised bed granulation process as described in Example 2 of Copending British patent application Ser. No. 16986/72, now British Pat. No. 1332764, published Oct. 3, 1973. The granules had the following characteristics:

particle size of from 0.5 to 0.6 mm
free flowing specific weight of 1.45 kg/dm³
sodium chlorite content of 80% by weight Air preheated to a temperature of 120°C was passed upwards through the distribution plate at a flow rate of 150 m³N/hour and fluidised the granules to form a bed 60 cm deep. The temperature of the bed was maintained at a temperature of 60°C by the combined action of the preheated air and the heating tubes. The coating solution (54 kg) containing 800 g of sodium nitrate per kg of water was fed into the bed throughout a period of 5½ hours, through a pneumatic spray on the cylinder wall 15 cm above the distribution plate.

The product obtained (64 kg) was entirely enveloped in sodium nitrate and had the following characteristics:

Average particle size of about 0.75 mm
Free flowing specific weight of 1.35 kg/dm³
Sodium Chlorite content of 50% by weight
% by weight sodium nitrate (based on uncoated granules) of 60%

EXAMPLE 2

In Example 2 the granules were coated using a rotating inclined disk in a continuous process. The apparatus comprised a rotating inclined disk having a diameter of 70 cm and a depth of 11.5 cm, whose angle of inclination to the horizontal was adjustable. It was rotated using a variable speed motor, and heated by a current of hot air directed over the surface of the granule bed. Coating solution was fed in via a nozzle perforated with a single hole and the accumulation of incrustations was avoided by means of a scraper.

In operation, the bed was charged initially with 15 kg of technical sodium chlorite granules having an average particle size of approximately 0.6 mm and the following composition:

| | | |
|---|---|---|
| $NaClO_2$ | 800 g/kg | based on uncoated granules |
| $NaClO_3$ | 20 g/kg | based on uncoated granules |
| NaCl | 150 g/kg | based on uncoated granules |
| NaOH | 5 g/kg | based on uncoated granules |
| $Na_2CO_3$ | 20 g/kg | based on uncoated granules |

The disk was inclined at an angle of 48°, rotated at 32 revs/minute and its bed maintained at a temperature of 60°C. The bed was fed with sodium nitrate solution containing 444 g $NaNO_3$ per kg of solution and at a temperature of 20°C, at a rate of 3.6 kg of solution per hour.

The disk was fed at a rate of 2.67 kg of technical chlorite per hour, and after a sufficient length of time had been allowed for a steady state to be reached, an output rate of 4.27 kg of coated chlorite per hour was obtained. The output had the following composition and physical characteristics:

| | | |
|---|---|---|
| $NaClO_2$ | 500 g/kg | based on the coated product |
| $NaClO_3$ | 12.5 g/kg | based on the coated product |
| NaCl | 93.9 g/kg | based on the coated product |
| NaOH | 3 g/kg | based on the coated product |
| $Na_2CO_3$ | 12.5 g/kg | based on the coated product |
| $NaNO_3$ | 375 g/kg | based on the coated product |

Average particle diameter of 0.75 mm
Free flowing specific weight of 1.3 kg/dm³

EXAMPLE 3

In this example sodium chlorite granules were coated using a rotary drum in a continuous process. The apparatus comprised a rotary drum having a diameter of 0.5 m and a length of 1.2 m. The drum was driven by a variable speed motor, was supported on rollers, and its angle of inclination to horizontal was adjustable. The ends of the drums cylinder were lagged and sealed. In order to provide means for stirring the granules a bladed shaft was placed at the bottom of the drum with its axis parallel to that of the drum, and rotated in the opposite sense, at a speed proportional to the speed of rotation of the drum. An inner recycling of the granules was thus carried out. At the outlet end of the drum an overflow pipe automatically adjusted the depth of granules in the bed.

In operation the apparatus was charged initially with 20 kg of technical sodium chlorite granules having a chlorite content of 80% and an average particle diameter of 0.6 mm. Technical chlorite was then fed in at a rate of 4.13 kg/hour. The drum was inclined to give a gradient of 5 cm/m, and rotated at 20 rev/min. Sodium nitrate solution (444 g $NaNO_3$ per kg of solution) was introduced into the bed of granules via a nozzle with several holes at a rate of 5.58 kg solution per hour, and at a temperature of 20°C.

The bed was maintained at a temperature of 60°C by means of gases having an input temperature of 120°C passing to atmosphere through the drum at a flow rate of 120 kg per hour. When a steady state was reached the output of coated granules through the overflow pipe was 6.61 kg per hour. The output had the same composition as that obtained in Example 2, but had a free flowing specific gravity of 1.25 kg/dm³.

EXAMPLE 4

In the following Example the stability of granular sodium chlorite in various forms was tested.

Two versions of the test were employed, one being a "cigarette test", the other centering around the measurement of decomposition temperature.

The cigarette test was based on the observation that a lighted cigarette brought into contact with chlorite caused the temperature to rise locally, thereby inducing decomposition of the chlorite locally and liberation of oxygen. The oxygen caused the cigarette to burn more and thus could lead to further decomposition. The extent and severity of the decomposition could be determined extremely quickly and qualitatively, because the compact mass of slag-like product could be separated easily. The test was done by placing a lit half-cigarette in the centre of a baking tin 24 mm deep, having a cross-section across the base of 142 mm and across the top of 172 mm, containing 200 g of the product to be examined. The results for loss of weight and presence of slag-like mass are percentages of weight based on the initial weight of the granules.

For measuring decomposition temperature, 10 g of the product to be examined were placed in a porcelain crucible (30 × 25 mm) which was put, open, in an electric furnace the heating rate of which was so regulated that the temperature rose at the rate of approximately 2°C per minute. The wall of the crucible was perforated halfway up with a hole approximately 3 mm in diameter through which passed a porcelain sheath approximately 2.8 mm in external diameter, housing a CHROMEL — ALUMEL thermocouple comprising wires 0.64 mm in diameter. As the temperature increased the change in E.M.F. was plotted at 3 second intervals on a Honeywell recorder on a 25 mV scale.

In each test, thermal decomposition of the chlorite occurred rapidly once a threshold temperature had been reached, and was shown by a sudden and sharp jump in the E.M.F. The tendency of various products to decompose could then be assessed by comparing the measured decomposition temperatures of various specimens.

In this Example in one set of results, uncoated chlorite granules were compared with granules having the same chlorite content but having a surface coating, and in a second set of results the effect of increasing the amount of coating was shown.

In the first set of results, summarised in Tables 1 and 2, the uncoated granules contained 50% by weight sodium chlorite and 50% by weight sodium nitrate, and the coated granules were produced by a process according to Example 1 and contained 50% by weight sodium chlorite, 12.5% by weight sodium chloride and, as a complete surface coating, 37.5% by weight sodium nitrate.

The % of contaminants shown was by weight based on the granules.

Table 1

| | Cigarette test | | | | | |
|---|---|---|---|---|---|---|
| | Plain | | | In the presence of 2% sublimed sulphur | | |
| Granules | loss of wt % | slag-like mass % | characteristics of the reaction | loss of wt % | slag-like mass % | characteristics of the reaction |
| Uncoated | 0 | 2 | local | 7 | 93 | total and rapid |
| Coated | 0 | 2 | local | 5 | 95 | total but very slow |

Table 2

| | Decomposition temperature, °C | | | |
|---|---|---|---|---|
| | Plain | Contaminants — 2% | | |
| Products | | sublimed sulphur | glucose | oil |
| Uncoated granules | 185 | 56 | 100 | 187 |
| Coated granules | 198 | 201 | 139 | 187 |

From Tables 1 and 2 it can be seen that, in the absence of contaminants, coated and uncoated granules behaved similarly, but that the coated granules were slightly better. In the presence of the selected solid contaminants, it can be seen that the coated granules were much superior, particularly in respect of the decomposition temperature.

When the contaminant was a liquid (oil), the decomposition temperature was the same for both coated and uncoated granules and no lower than for uncoated granules simpliciter. Thus, it may be seen that although the coating had no effect (presumably because the oil diffused through the whole mass of the granules), the oil itself had no accelerating effect upon decomposition, unlike e.g. sulphur.

In addition to the results given in the above Tables it was also observed that the uncoated chlorite granules decomposed spontaneously after storage for 3 hours at ambient temperatures in the presence of 2% sublimed sulphur, whereas under identical conditions the coated granules had not spontaneously decomposed even after 5 days.

In the second set of results, summarised below in Tables 3 and 4, the stability of uncoated granules containing 80% by weight sodium chlorite and 20% by weight sodium chlorite was compared with the stability of granules of the same composition coated completely with successively increasing amounts of sodium nitrate. The percentage of sodium nitrate is by weight based on the coated granules.

Table 3

| | The effects of the amount of coating agent Cigarette test | | | | | |
|---|---|---|---|---|---|---|
| | Plain | | | + 2% of sublimed sulphur | | |
| Granules | % wt loss | slag-like mass % | reaction characteristics | % wt loss | slag-like mass % | reaction characteristics |
| Uncoated | 7 | 93 | total and rapid | 35 | 65 | total and very rapid |
| Coated in 12.5% NaNO$_3$ | 0 | 5 | local | 25 | 75 | total and rapid |
| Coated in 25% NaNO$_3$ | 0 | 2 | local | 8 | 92 | total but slow |
| Coated in 37.5% NaNO$_3$ | 0 | 2 | local | 5 | 95 | total but very slow |

Table 4

| | The effects of the amount of coating agent - Decomposition temperature, °C | |
|---|---|---|
| Granules | Plain | + 2% of sublimed sulphur |
| Uncoated | 204 | 112 |
| Coated in 12.5% NaNO$_3$ | 199 | 131 |
| Coated in 25% NaNO$_3$ | 202 | 163 |
| Coated in 37.5% NaNO$_3$ | 198 | 201 |

As may be seen from Tables 3 and 4 the effect of increasing the coating is to increase the stability of the granules, particularly in the presence of solid contaminants.

We claim:

1. An alkali metal chlorite-containing product comprising (a) alkali metal chlorite-containing particles and (b) a coating on said particles, said coating being an inorganic salt selected from the group consisting of sodium nitrate, sodium carbonate, sodium bicarbonate, sodium phosphate, sodium silicate, sodium chloride, potassium nitrate, potassium carbonate, potassium bicarbonate, potassium phosphate, potassium silicate, potassium chloride and mixtures thereof.

2. A product as claimed in claim 1 wherein the alkali metal chlorite is sodium chlorite.

3. A product as claimed in claim 1 wherein the particles are granules.

4. A product as claimed in claim 1, wherein the alkali metal chlorite-containing particles comprise a mixture of alkali metal chlorite and an inorganic salt different from the alkali metal chlorite.

5. A product as claimed in claim 4 wherein said different inorganic salt in the particles is a nitrate, carbonate, bicarbonate, phosphate, silicate or chloride.

6. A product as claimed in claim 5 wherein said different inorganic salt in the particles is an alkali metal salt or an alkaline earth metal salt.

7. A product as claimed in claim 6 wherein said different inorganic salt in the particles is a sodium or potassium salt.

8. A product as claimed in claim 1 wherein the particles are coated in at least 10% by weight based on uncoated particles of the inorganic salt.

9. Coated alkali metal chlorite-containing particles as claimed in claim 1 and which suffer substantially no loss in weight when contacted, in the absence of contaminants, with a lighted cigarette.

* * * * *